D. R. COLLIER.
STOOL.
APPLICATION FILED FEB. 24, 1921.
1,399,465.
Patented Dec. 6, 1921.
2 SHEETS—SHEET 1.
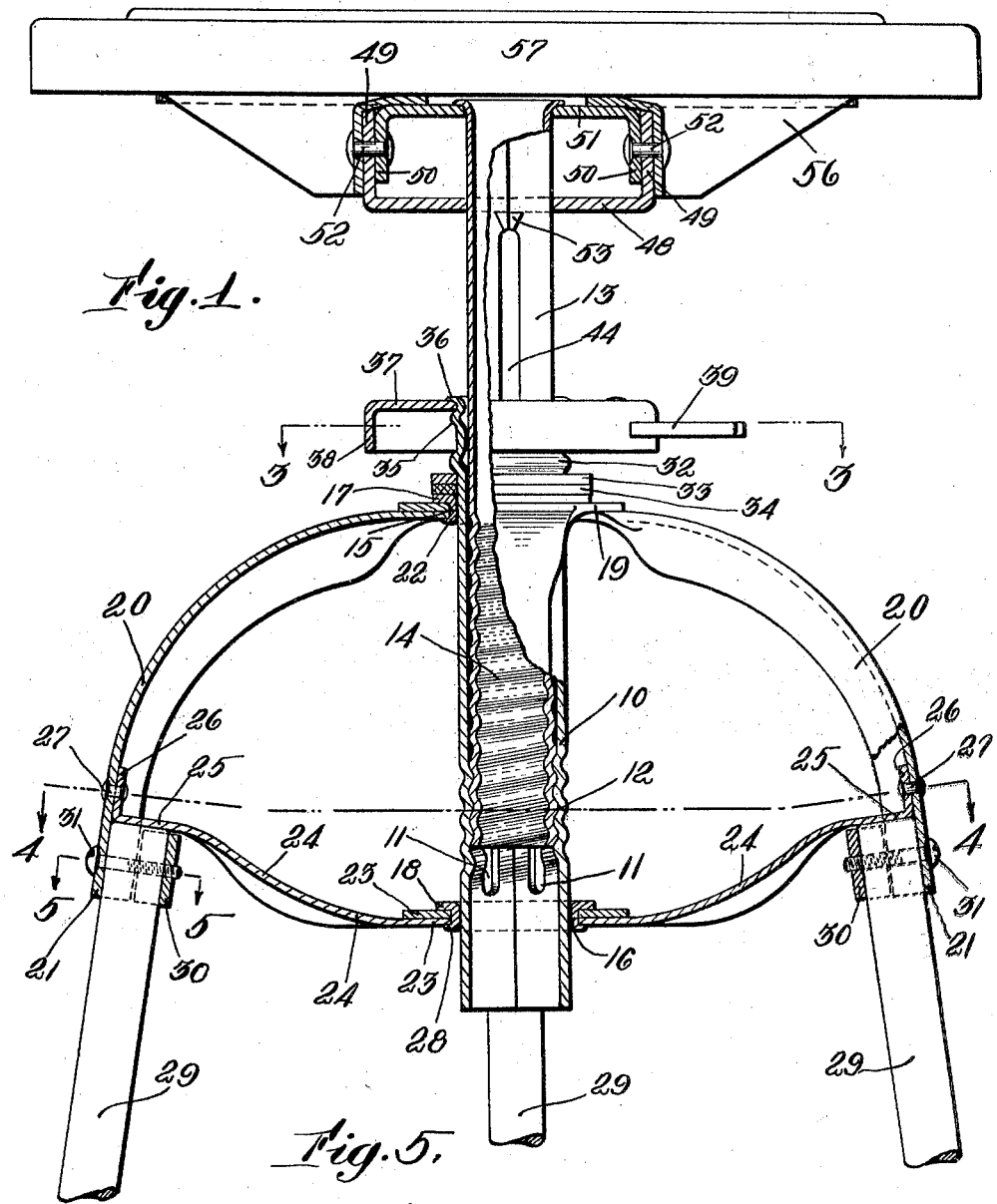
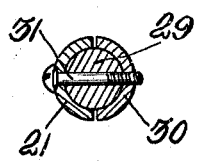
Inventor:
David R. Collier

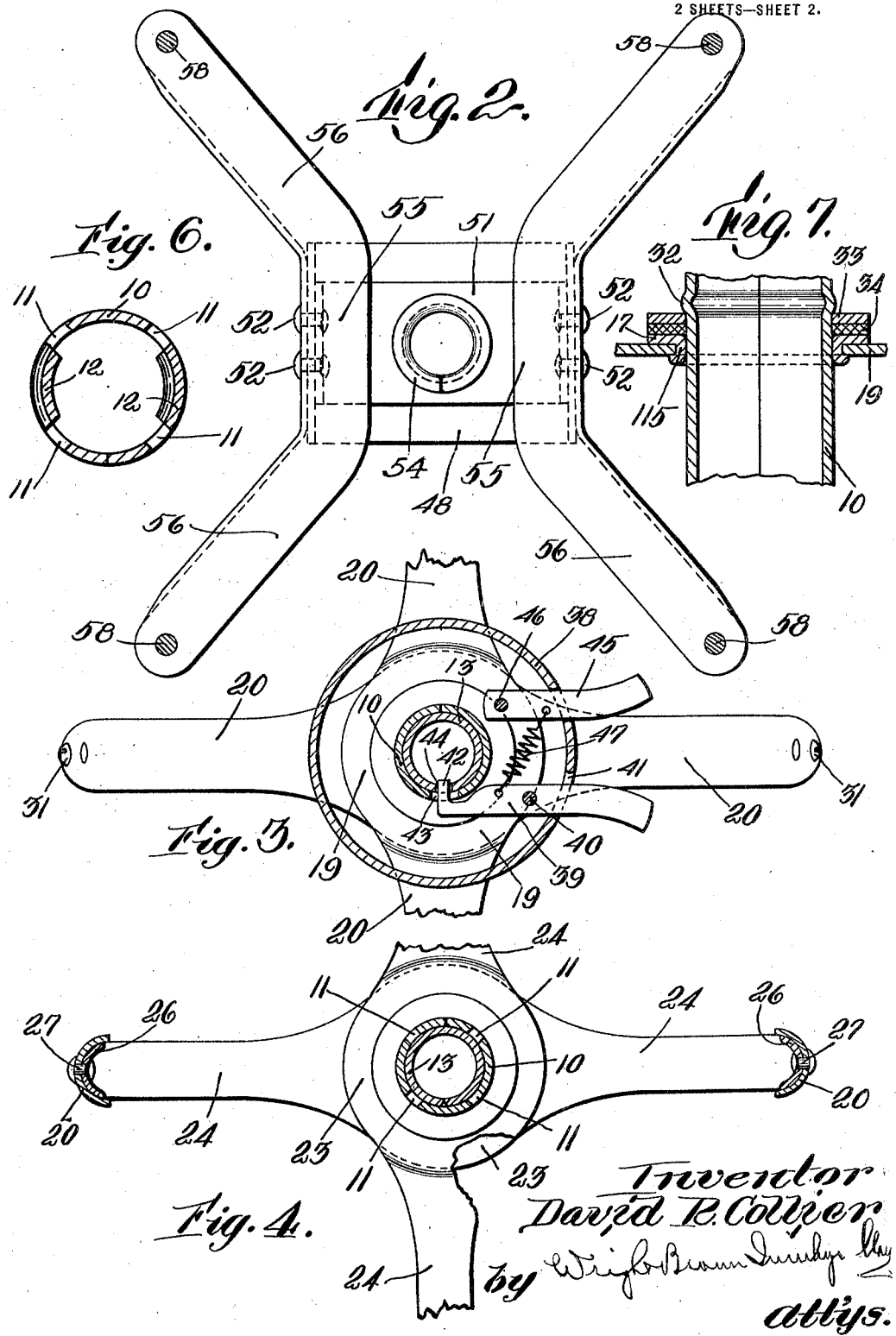

UNITED STATES PATENT OFFICE.

DAVID R. COLLIER, OF GARDNER, MASSACHUSETTS, ASSIGNOR TO COLLIER-KEYWORTH COMPANY, OF GARDNER, MASSACHUSETTS, A CORPORATION OF MASSACHUSETTS.

STOOL.

1,399,465.  Specification of Letters Patent.  Patented Dec. 6, 1921.

Application filed February 24, 1921. Serial No. 447,524.

*To all whom it may concern:*

Be it known that I, DAVID R. COLLIER, a citizen of the United States, residing at Gardner, in the county of Worcester and State of Massachusetts, have invented new and useful Improvements in Stools, of which the following is a specification.

This invention has relation to stools and has for its object to provide an iron which is, by reason of its construction of sheet metal, inexpensive to produce, and which moreover is light and strong. A further object is to provide an improved iron which permits the seat to revolve freely but which also provides for its vertical adjustment.

Of the accompanying drawings,—

Figure 1 illustrates, partially in section, a stool embodying the invention.

Fig. 2 represents the spider in plan view.

Fig. 3 represents a section on the line 3—3, of Fig. 1.

Fig. 4 represents a section on the line 4—4, of Fig. 1.

Fig. 5 represents a section on the line 5—5, of Fig. 1.

Fig. 6 represents a section through the hub.

Fig. 7 shows the bearing member for a pair of crossed bars, as formed integrally with one of the bars.

The particular embodiment of the invention, shown by the drawings thus briefly referred to, comprises a sleeve 10 which preferably consists of a sheet metal tube or cylinder. This may be made of drawn seamless tubing or may consist of a flat metal blank bent into the form of a tube, as may be most convenient. This sleeve is formed with screw threads to permit the vertical adjustment of a spindle which has complemental threads. For the formation of the threads, the sleeve, near its lower end, has four parallel, equally spaced, longitudinal slots 11 dividing the tube into segments, and two diametrically opposite segments are provided with matching sections of concavo-convex screw threads 12. Any suitable dies may be utilized in the formation of the threads, the crowns of which project into the bore of the sleeve beyond the interior cylindrical surface thereof.

Located in the sleeve there is a tubular spindle 13, which may likewise be made of either drawn tubing or preferably of a flat sheet-metal blank curved into proper shape by suitable dies and forming mechanism. This spindle is formed with a threaded portion as indicated at 14 so as to engage the interrupted threads of the sleeve, so that it may be vertically adjusted when rotated relatively to the sleeve. The head and the spider which are supported by the sleeve, and the means utilized to lock the sleeve and spindle together are explained in a subsequent portion of this specification.

The sleeve is mounted in a hub so as to rotate freely therein. The hub comprises two annular members 15, 16, which are illustrated as short sleeves or collars or annular bearing members having peripheral flanges 17, 18, respectively, and a hollow frame consisting of two pairs of crossed sheet-metal bars secured together and to said collars. The frame, as shown, comprises four bars, two of which are attached to the collar 15 and two to the collar 16, the bars of each pair being arranged to cross each other at right angles. Of the upper pair of bars, each comprises a flat central disk-like hub or body portion 19 having radially-projecting arms 20 which are semi-cylindrical in cross section, each bar being bow-shaped or curved in the direction of its length through an arc of slightly less than 90°, with straight end portions 21 which are divergent. These arched bars are so arranged that the arms are equally spaced radially about the axis of the sleeve 10. Their centrally-apertured hubs are secured to the collar 15 by forcing them friction-tight thereon until they bear against the flange 17 and then peening or upsetting the lower end of the collar as at 22 to bind them tightly against the flange 17. It is obvious that the collar or bearing member may be formed integrally with the body portion of one of the bars as indicated at 115 in Fig. 7.

The two lower bars have flat centrally-apertured disk-like or body portions 23 and radiating arms 24 which are curved longitudinally upwardly with straight end portions 25 terminating in upwardly-bent concavo-convex extremities 26 secured by rivets 27 to the end portions of the arms 20. The arms 24 between their ends may be transversely curved to increase their rigidity. The hubs or body portions of the lower bars may be secured to the collar 16, in the same way as the hubs of the upper bar are attached to the collar 15, being clamped against the flange 18 by the peened or upset flange 28. The collars 15, 16 are spaced apart and are in axial alinement. The legs 29, of which there are four, are formed at their upper ends to fit in the semi-cylindrical ends or socket-forming extremities 21 of the arms 20, and they are secured thereto by semi-cylindrical clamping members 30 which have threaded apertures to receive clamping screws 31 passed through non-threaded apertures formed in the ends of bars 21 and formed transversely through the upper ends of the legs 29. The straight end portions 25 of the arms 24 serve as stops or abutments located at the upper ends of the sockets formed by the clamps and the end members 21, to form the inner ends of said sockets, and against which the ends of the legs bear, so that the lower ends of the legs (assuming that they are of equal length) terminate in the same plane.

The sleeve 10 is freely rotatable in the hub last described, and is removably supported thereby. It has a peripheral bead 32 against which is forced a sheet metal washer 33, fitting tightly in the sleeve, and between the washer and the flange 17 of the collar 15 may be introduced any friction-reducing element, such as a fiber or graphitized loose washer 34. The sleeve is thus held on the hub so that, while it may rotate freely, it may be lifted from engagement therewith.

For the purpose of locking the spindle and sleeve together, after the former has been adjusted to the desired height, any suitable form of locking mechanism may be employed. For example, I may secure upon the upper end of the sleeve, between a bead 35 and an upset or peened flange 36, a disk 37 having a downturned rim or flange 38. A locking lever 39 is pivoted on a stud 40 projecting downwardly from the disk, and has one end projecting through a slot 41 in the flange 38, and the other end formed with a dog 42 extending through an aperture 43 in the sleeve so as to enter a longitudinal slot 44 in the spindle. A rigid bar or member 45 is secured to the disk 37 by a rivet 46, so as to project through an aperture in the rim, as shown in Fig. 3, so that it may serve as an abutment for the hand when the lever 39 is to be operated. A spring 47, connected to the locking lever and to the bar or member 45, serves to hold the dog 42 in the slot 44.

On the upper end of the spindle there is secured a head consisting of two yokes (of which one is inverted) nesting one in the other. The lower yoke consists of a cross bar 48, with upstanding ends 49, overlapping the downturned ends 50 of the cross bar 51 of the other yoke. The overlapping ends 49, 50, are secured together by rivets 52. The cross bars of the yokes are apertured to receive the upper end of the spindle, which has lugs 53 formed thereon on which the lower yoke rests, the extremity of the spindle being spun or peened outwardly as at 54 to engage the upper yoke, whereby the head is locked rigidly on the spindle.

The spider, which is secured to the head, comprises two angle iron bars 55, 55, with horizontal and vertical webs, so as to fit on the head, the vertical webs being secured thereto by the rivets 52. Those body portions of the spider bars which cross the head are parallel, but the end portions of each bar are bent laterally to provide arms 56 which are approximately radial to the vertical axis of the spindle, so that a circular seat 57 may be secured to said arms by screws or other fastenings 58.

The parts herein described, with the exception of the seat 57, may all be formed of sheet metal died and stamped into proper shape, so that the entire structure is light, strong and durable, and easy and cheap to manufacture.

What I claim is:

1. A hub consisting of a frame comprising two pairs of separate crossed sheet-metal bars, the ends of the bars of each pair being secured to the ends of the corresponding bars of the other pair, and the crossed portions of the bars of said pairs of bars being provided with alined apertures.

2. A hub comprising two pairs of separate crossed bars, each pair furnishing four radiating arms, the arms of one pair being secured at their outer ends to the arms of the other pair, said pairs of bars being apertured and provided in such apertures with centrally-located bearing and attaching members spaced from but axially alined with each other.

3. An iron comprising an upright central cylindrical member, two vertically-spaced pairs of crossed sheet-metal bars affording radiating arms, and apertured at their central portions to receive said cylindrical member, the ends of the arms of one pair of bars being secured to the ends of the arms of the other pair of bars.

4. A hub frame comprising two pairs of horizontally crossed bars, spaced one above the other, the upper bars being arched and having downwardly-projecting ends, and the lower bars having their ends rigidly secured to the ends of the upper bars.

5. A hub frame comprising two pairs of horizontally crossed bars, spaced one above the other, the upper bars being arched and having downwardly-projecting ends, the lower bars having their ends secured to the ends of the upper bars, and annular bearing members at the crossed portions of said pairs of bars.

6. A hub frame comprising two pairs of horizontally crossed bars, spaced one above the other, the upper bars being arched and having downwardly-projecting ends, the lower bars having their ends secured to the ends of the upper bars, and means for clamping legs to the extremities of said arched bars.

7. A hub frame comprising two pairs of horizontally crossed bars, spaced one above the other, the upper bars being arched and having downwardly-projecting ends, the lower bars having their ends secured to the ends of the upper bars above the extremities thereof, and leg clamps attached to said extremities.

8. A hub frame comprising two pairs of horizontally crossed bars, spaced one above the other, the upper bars being arched and having downwardly-projecting ends, the lower bars having their ends secured to the ends of the upper bars, and clamping members associated with the extremities of said arched bars, in combination with legs engaged by said clamps and abutting against the ends of the lower pair of bars.

9. A hub frame comprising two pairs of horizontally crossed bars, spaced one above the other, the upper bars being arched and having downwardly-projecting ends, and each bar of the lower pair being in the shape of an inverted arch, the ends of the bars of one pair being secured to the ends of the bars of the other pair.

10. A hub frame comprising two vertically-spaced sets of radiating arms, the arms of the upper set being curved downwardly and secured to the arms of the lower set, and a rotatable cylindrical member passed through apertures in said arms, alined with the common axis to which said arms are radial, and supported upon the upper set of arms.

11. An iron comprising an upright central tubular member, spaced collars or bearing members in which the tubular member is journaled, a set of radiating arms secured to each of said collars, one set of said arms being curved and secured at the ends thereof to the other set of arms, and leg-clamping means at the ends of the arms of one of said sets.

12. An iron comprising an upright central tubular member, spaced collars or bearing members in which the tubular member is journaled, a pair of crossed centrally-apertured bars secured to each collar and furnishing radiating arms, one set of such arms being curved and having straight socket-forming extremities, and the other set of said arms having their ends secured to the first-mentioned set of arms, and clamping members associated with said socket-forming extremities.

13. In combination, an upright rotatable threaded sleeve, a spindle in threaded engagement therewith and provided with a seat-supporting head, means for locking said spindle and sleeve against rotation, two spaced bearing members in which said sleeve is journaled and on one of which it is supported, and sets of radiating arms secured to said bearing members, the arms of one set being arched and secured to the arms of the other set, and leg sockets at the ends of said arms.

In testimony whereof I have affixed my signature.

DAVID R. COLLIER.